(12) United States Patent
Slone et al.

(10) Patent No.: US 8,321,839 B2
(45) Date of Patent: Nov. 27, 2012

(54) ABSTRACTING TEST CASES FROM APPLICATION PROGRAM INTERFACES

(75) Inventors: Justin A. Slone, Seattle, WA (US); Ashwin S. Needamangala, Redmond, WA (US); Mariyan D. Fransazov, Redmond, WA (US); Herman Widjaja, Issaquah, WA (US); Andy M. K. Cheng, Redmond, WA (US); Dimitar K. Popov, Redmond, WA (US); Elliot W. Kirk, Bellevue, WA (US); Patrick T. O'Brien, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 12/118,755

(22) Filed: May 12, 2008

(65) Prior Publication Data

US 2009/0282389 A1    Nov. 12, 2009

(51) Int. Cl.
    G06F 9/44    (2006.01)
(52) U.S. Cl. .......................... 717/124; 717/125; 717/126
(58) Field of Classification Search .................. 717/124, 717/125, 126
See application file for complete search history.

(56) References Cited

U.S. PATENT DOCUMENTS

| | | |
|---|---|---|
| 5,701,408 A | 12/1997 | Cornell et al. |
| 6,880,109 B2 | 4/2005 | Belenger et al. |
| 6,944,848 B2 | 9/2005 | Hartman et al. |
| 7,818,665 B1 * | 10/2010 | Russin et al. .................. 715/236 |
| 2002/0133807 A1 | 9/2002 | Sluiman |
| 2004/0117769 A1 * | 6/2004 | Lauzon et al. ................. 717/125 |
| 2005/0071447 A1 | 3/2005 | Masek et al. |
| 2005/0160322 A1 | 7/2005 | West et al. |
| 2005/0188271 A1 | 8/2005 | West et al. |
| 2005/0223360 A1 * | 10/2005 | Seeman et al. ................. 717/124 |
| 2006/0218538 A1 * | 9/2006 | van Kesteren ................ 717/137 |
| 2008/0010588 A1 * | 1/2008 | Wake et al. .................... 715/234 |
| 2008/0071812 A1 * | 3/2008 | Baby et al. ..................... 707/101 |
| 2008/0155367 A1 * | 6/2008 | Boskovic ....................... 714/736 |
| 2008/0155506 A1 * | 6/2008 | Boskovic ....................... 717/124 |
| 2009/0282389 A1 * | 11/2009 | Slone et al. .................... 717/124 |

OTHER PUBLICATIONS

Bob Watson, "A First Look at APIs for Creating XML Paper Specification Documents", MSDN Magazine, Issued Jan. 2006, retrieved from <http://msdn.microsoft.com/en-us/magazine/cc163664.aspx> total pages 14.*
"XML Paper Specification", dated Oct. 24, 2006, Retrieved from <http://msdn.microsoft.com/en-us/windows/hardware/gg463431.aspx> total pages 2.*
Perkins et al. "Performance Analysis of XML APIs", 2005—cs.toronto.edu, retrieved from <http://www.cs.toronto.edu/~aheifets/papers/apis_xml2005.PDF>, total pages 15.*
Herman, "Step up Handset Test With Adaptive Test Case", EE Times-Asia, 2007, pp. 1-3.

* cited by examiner

Primary Examiner — Don Wong
Assistant Examiner — Marina Lee
(74) Attorney, Agent, or Firm — Wolfe-SBMC

(57) ABSTRACT

Various embodiments provide a testing infrastructure that abstracts test cases from APIs in a manner that allows for round tripping between production and consumption and APIs.

12 Claims, 7 Drawing Sheets

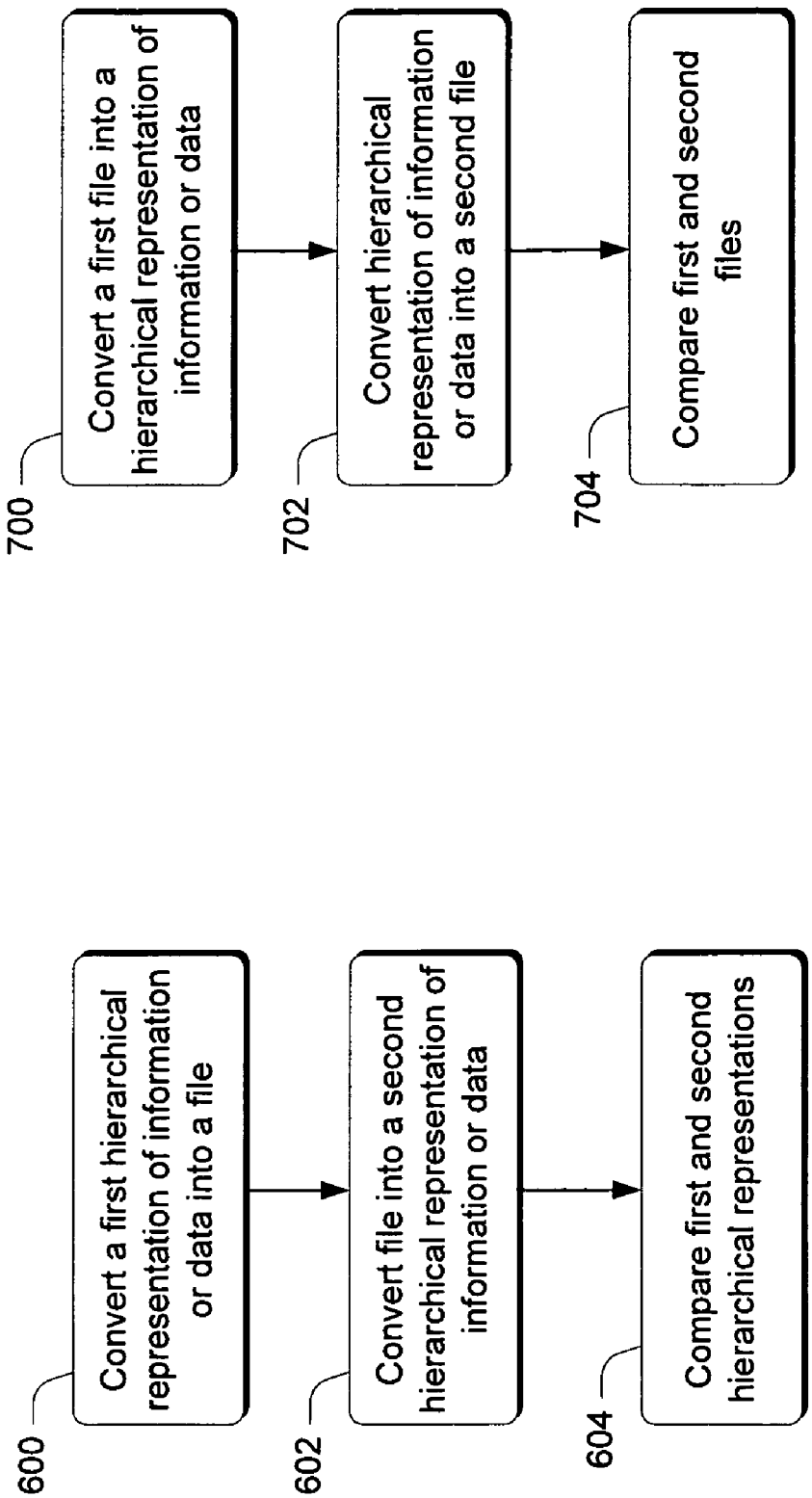

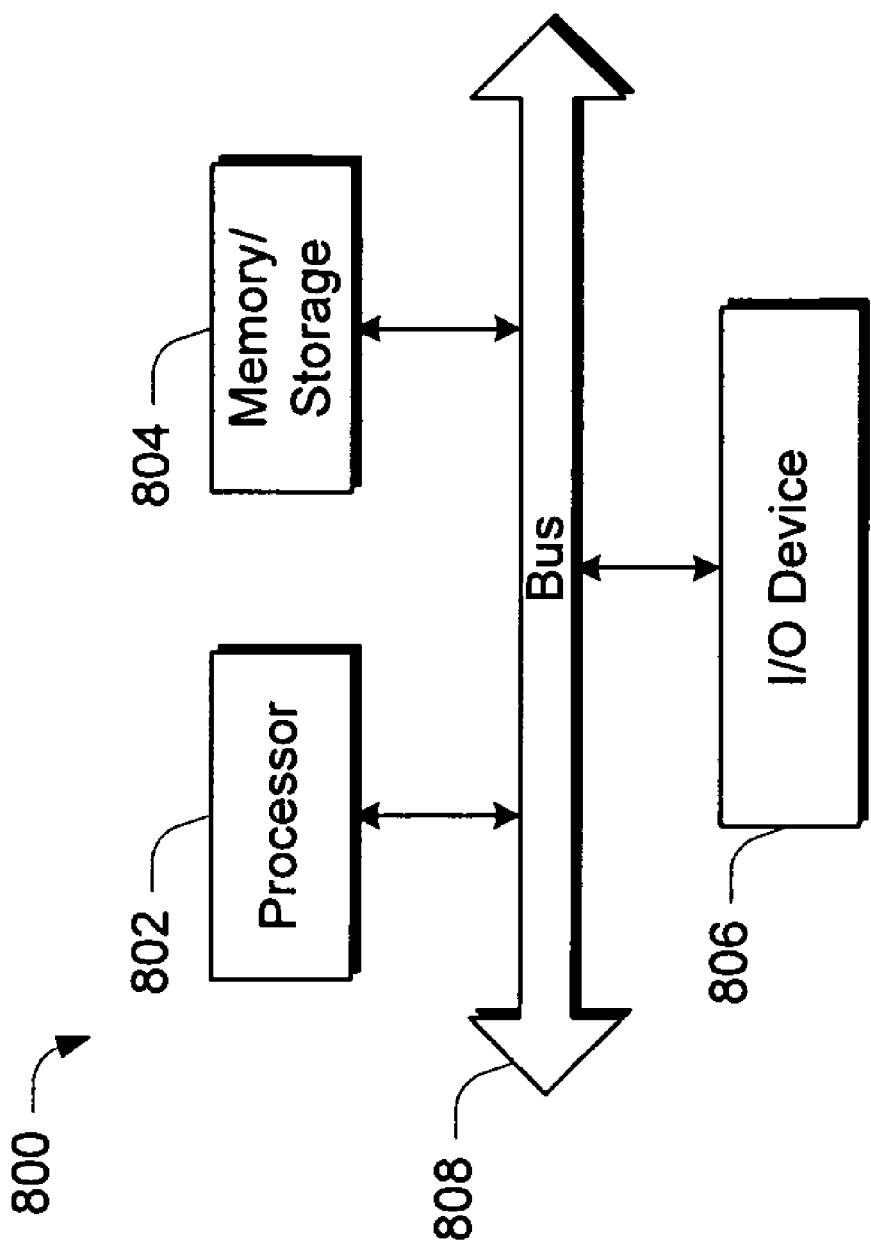

ABSTRACTING TEST CASES FROM APPLICATION PROGRAM INTERFACES

BACKGROUND

One way to test software code such as developer code or "dev code" is through the use of test-driven development. Some test-driven development scenarios utilize a so-called expected result or expected output approach. Specifically, given a set of data and application program interfaces (APIs) that are to be utilized to process the data to produce a result, an expected result or expected output is defined in advance and used to compare output from the APIs that was produced using a provided data set. This approach can be problematic for a number of reasons. For example, using the above-described approach, testers must define the expected result or expected output in advance so that a comparison can be made. In addition, if the APIs are changed in any meaningful way, a new expected result or expected output must typically be redefined or re-created to perform a valid comparison.

Both of these problems can create extra work for software testers which can be compounded as the complexities of the data set and APIs grow.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a testing infrastructure that abstracts test cases from APIs in a manner that allows for round tripping between production and consumption and APIs.

In at least some embodiments, first information or data can be processed by software code under test, for example production-side APIs, to produce a first file. This first file can then be processed by other software code to produce second information or data which is then compared to the first information or data to ascertain whether the first and second information or data are semantically the same or similar. If the first and second information or data compares favorably, then the software code under test can be validated. In at least some embodiments, the first and second information or data can comprise a hierarchical representation of data such as that which can be represented in XML.

In at least some other embodiments, a first file can be processed by software code under test, for example consumption-side APIs, to produce first information or data. The first information or data can then be processed by other software code to produce a second file which is then compared to the first file to ascertain whether the first and second files are semantically the same or similar. If the first and second files compare favorably, then the software code under test can be validated. In at least some embodiments, the first and second information or data can comprise a hierarchical representation of data such as that which can be represented in XML.

BRIEF DESCRIPTION OF THE DRAWINGS

The same numbers are used throughout the drawings to reference like features.

FIG. 6 illustrates a flow diagram that describes steps in a method in accordance with one or more embodiments.

FIG. 7 illustrates a flow diagram that describes steps in a method in accordance with one or more embodiments.

FIG. 8 is a block diagram of an example system that can be utilized to implement one or more embodiments.

DETAILED DESCRIPTION

Overview

Figure 1:
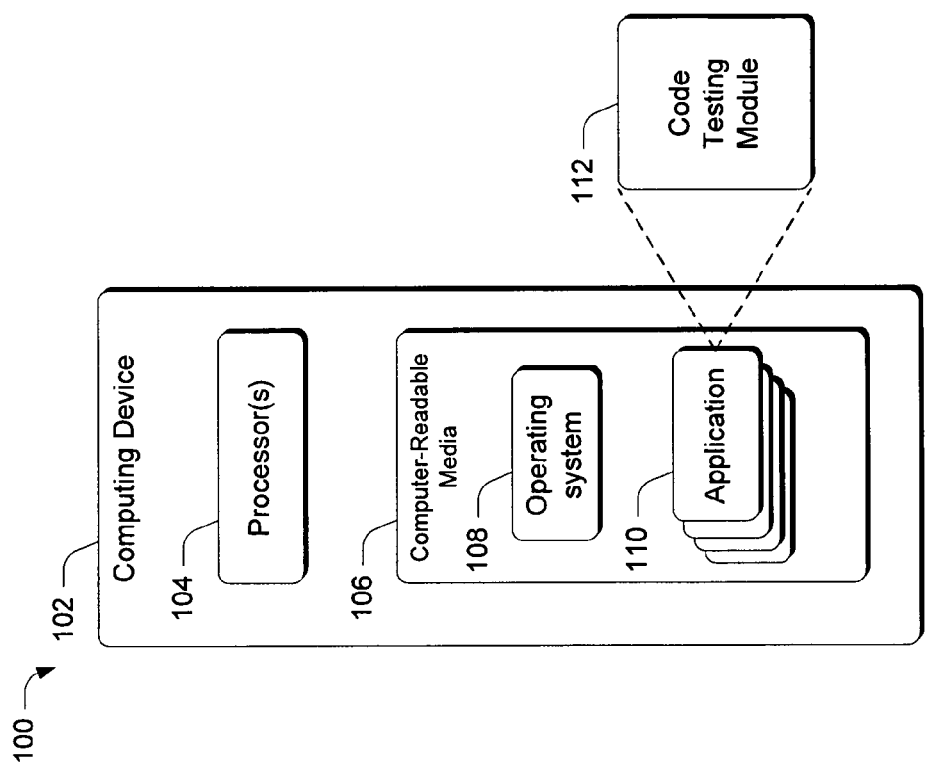
FIG. 1 illustrates an example operating environment in which various inventive principles can be employed in accordance with one or more embodiments.

Various embodiments provide a testing infrastructure that abstracts test cases from APIs in a manner that allows for round tripping between production and consumption and APIs.

In at least some embodiments, first information or data can be processed by software code under test, for example production-side APIs, to produce a first file. This first file can then be processed by other software code to produce second information or data which is then compared to the first information or data to ascertain whether the first and second information or data are semantically the same or similar. If the first and second information or data compares favorably, then the software code under test can be validated. In at least some embodiments, the first and second information or data can comprise a hierarchical representation of data such as that which can be represented in XML.

In at least some other embodiments, a first file can be processed by software code under test, for example consumption-side APIs, to produce first information or data. The first information or data can then be processed by other software code to produce a second file which is then compared to the first file to ascertain whether the first and second files are semantically the same or similar. If the first and second files compare favorably, then the software code under test can be validated. In at least some embodiments, the first and second information or data can comprise a hierarchical representation of data such as that which can be represented in XML.

Further, in at least some embodiments, the testing infrastructure can produce, in the production-side case, an object model from the first information or data and/or from the first file. Similarly, in at least other embodiments, the testing infrastructure can produce, in the consumption-side case, an object model from the first file and/or the first information or data.

Using the techniques described above and below, test cases can be abstracted from APIs to allow for round tripping between production and consumption APIs as will become apparent below.

In the discussion that follows, a section entitled "Operating Environment" describes but one operating environment that can be utilized to practice the inventive principles described herein in accordance with one or more embodiments. Following this, a section entitled "Example Embodiment" describes an example embodiment that utilizes the principles described herein. Following this, a section entitled "Example Embodiment Utilizing Object Models" describes embodiments that can utilize object models in accordance with one or more embodiments. Next, a section entitled "Example Methods"

describes example methods in accordance with one or more embodiments. Next, a section entitled "Implementation Example" describes an implementation example that can utilize the principles described herein. Last, a section entitled "Example System" describes an example system that can be utilized to implement one or more embodiments.

Operating Environment

FIG. 1 illustrates an example operating environment, generally at 100, in which various inventive principles can be employed in accordance with one or more embodiments.

Environment 100 includes a computing device 102 that can be used to abstract test cases from application program interfaces (APIs) to allow round tripping between production and consumption APIs. Computing device 102 can typically include one or more processors 104, one or more computer-readable media 106, an operating system 108 and one or more applications 110 that reside on the computer-readable media and which are executable by the processor(s). Applications 110 can include a code testing module 112 that operates as described above and below.

The computer-readable media can include, by way of example and not limitation, all forms of volatile and non-volatile memory and/or storage media that are typically associated with a computing device. Such media can include ROM, RAM, flash memory, hard disk, removable media and the like.

The computing device can be embodied as any suitable computing device such as, by way of example and not limitation, a desktop computer, a portable computer, a handheld computer such as a personal digital assistant, and the like. One example of a computing device is shown and described below in relation to FIG. 8.

Having discussed a general operating environment, consider now an example embodiment.

EXAMPLE EMBODIMENT

Figure 2:
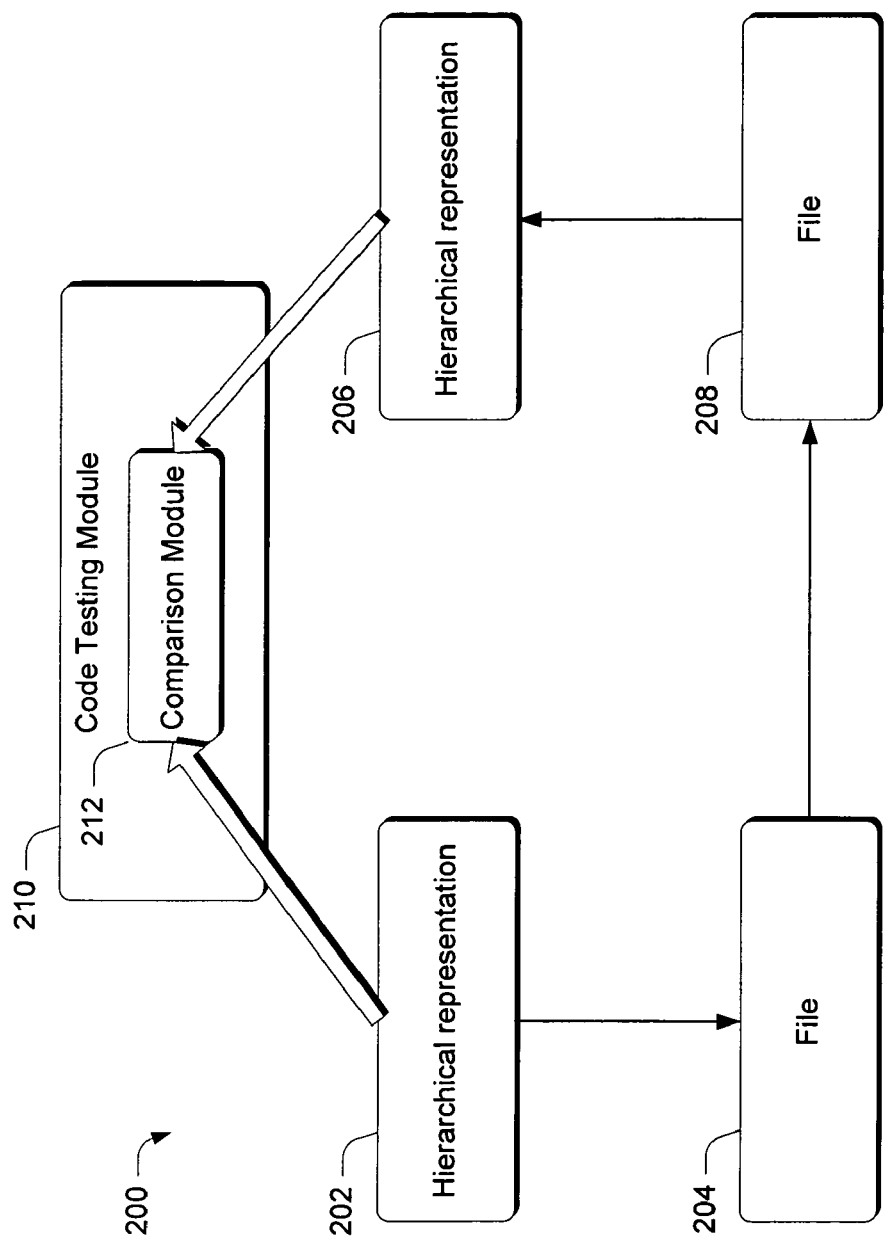
FIG. 2 illustrates a system in accordance with one or more embodiments.

FIG. 2 illustrates a system in accordance with one or more embodiments generally at 200. In this example, system 200 includes a first hierarchical representation 202 that describes information or data that can be serialized by software code, such as developer code, into a first file 204. System 200 also includes a second hierarchical representation 206 and a second file 208. In addition, system 200 includes a code testing module 210 which, in this example, includes a comparison module 212 that is configured to compare hierarchical representations 202, 206 which can be used to validate the developer code mentioned above.

In one or more embodiments, the hierarchical representation 202 can include any suitable hierarchical representation that describes information or data. In at least some embodiments, the hierarchical representation can comprise an XML representation that includes nodes and sub-nodes corresponding to elements and sub-elements within the XML representation. In this example, developer code (e.g. production-side APIs) which is undergoing testing is utilized to process the hierarchical representation 202 by serializing the hierarchical representation into a file such as file 204. In this particular embodiment, code testing module 210 is utilized to validate the developer code that is utilized to serialize the hierarchical representation 202 into the file 204. Typically, serialization is performed by making a series of API calls to a suitably-configured collection of APIs, as will be appreciated by the skilled artisan. This collection of APIs can be considered a collection of so-called production APIs because they produce the contents of file 204.

In this particular example, once the hierarchical representation 202 is serialized into file 204, the file can be copied to provide a second file 208. In accordance with one or more embodiments, developer code which is not undergoing testing is then utilized to read the contents of file 208 and deserialize the file contents into a second hierarchical representation 206. Again, any suitable hierarchical representation can be used. In this particular example, the hierarchical representation comprises an XML representation.

Once the first and second hierarchical representations 202, 206 are created, comparison module 212 can effectively compare the hierarchical representations to ascertain whether the hierarchical representations are semantically the same or similar. In at least some embodiments, this can be done by ascertaining whether the elements and sub-elements in the hierarchical representations are semantically the same or similar. If the comparison performed by comparison module 212 is favorable, then the code under test (i.e. the production-side APIs) can be validated.

The process of moving from the first hierarchical representation 202 to the second hierarchical representation 206 is referred to as "round tripping". In one or more embodiments, round tripping in this manner abstracts the testing infrastructure represented by system 200 from the particular APIs that were utilized to create file 204. As will be appreciated by the skilled artisan, this alleviates the need to pre-define an expected result, such as a separate "expected" file that would be utilized to compare with file 204 in order to validate the developer code that created file 204. Doing so means that any arbitrary hierarchical representation can be the subject of the processing that is performed by system 200. One of the benefits that flows from this type of processing is that changes in the APIs do not require modification of the test cases and test case development can take place in parallel with the original creation or modification of the API.

To underscore this advantage, consider the situation in which an expected result file would be used to perform the comparison with file 204. In this case, any changes in the underlying APIs which would change the contents of file 204 would, necessarily, have to be reflected in the expected result file. Accordingly, this would mean that a new expected result file would have to be defined for even small changes to the APIs. For arbitrarily large API collections, this is a daunting task. Here, however, because the testing infrastructure is abstracted from the particular APIs, the same testing infrastructure can be used for modified APIs.

Specifically, in illustrated and described embodiment, if comparison module 212 compares hierarchical representations 202, 206 and the result is favorable, the conclusion can be made that the developer code that processed the hierarchical representation 202 into the file 204 is valid and functioning as intended. In the case where APIs have been modified, testing can still be performed by comparing the first hierarchical representation 202 with the second hierarchical representation 206.

In this particular example, the APIs that are the subject of the testing comprise so-called production APIs. In a similar process, a testing infrastructure can be utilized to test so-called consumption APIs. As an example, consider FIG. 3.

Figure 3:
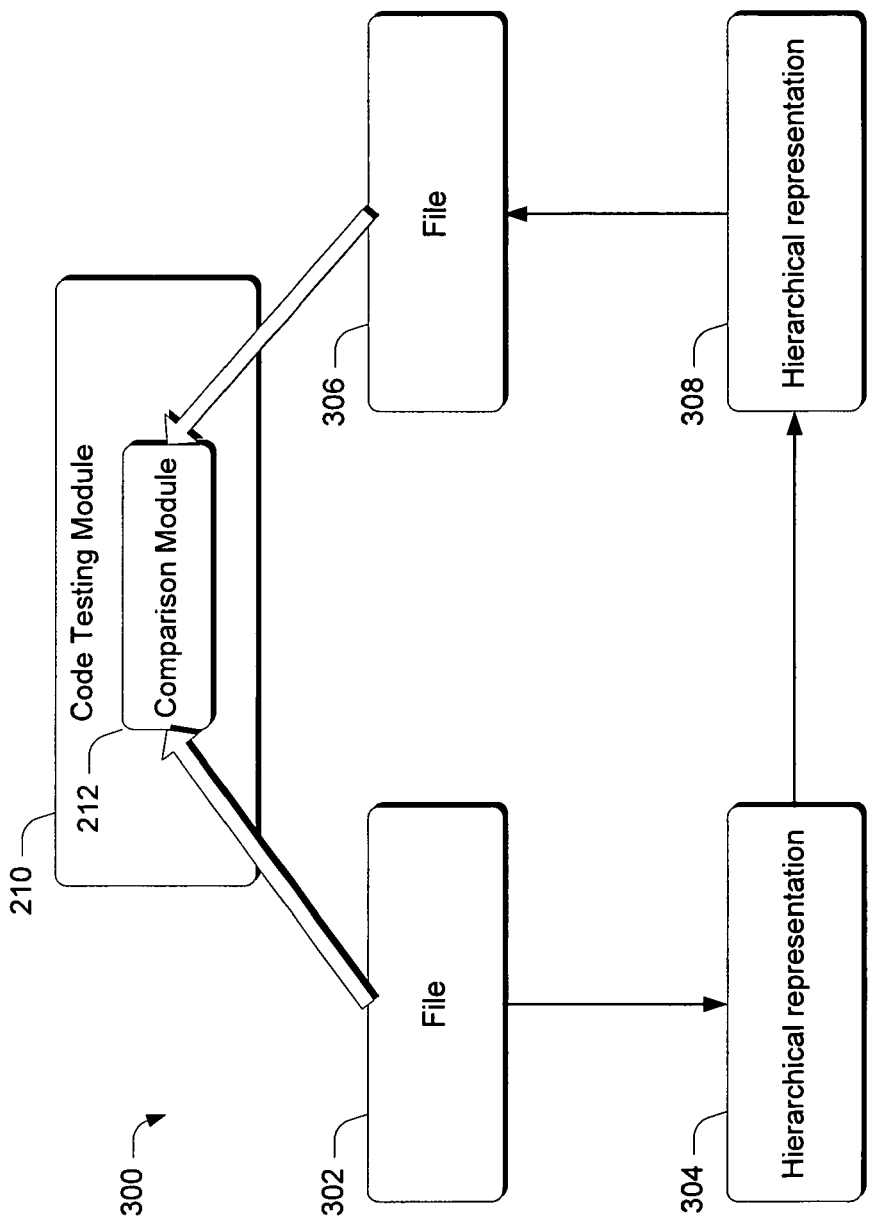
FIG. 3 illustrates a system in accordance with one or more embodiments.

FIG. 3 illustrates a system in accordance with one or more embodiments generally at 300. In this example, system 300 includes a first file 302 that contains information or data that can be deserialized by software code under test, such as developer code (e.g., consumption-side APIs), into a first hierarchical representation 304. System 300 also includes a second file 306 and a second hierarchical representation 308. In addition, system 300 includes code testing module 210 which, in this example, includes comparison module 212 that is configured to compare files 302, 306 which can be used to validate the developer code that is utilized to deserialize file 302 into first hierarchical representation 304.

In one or more embodiments, the hierarchical representation 304 can include any suitable hierarchical representation that describes information or data. In at least some embodiments, the hierarchical representation can comprise an XML representation that includes nodes and sub-nodes corresponding to elements and sub-elements within the XML representation. In this example, developer code which is undergoing testing is utilized to process the file 302 by deserializing the file into hierarchical representation 304. In this particular embodiment, code testing module 210 is utilized to validate the developer code that is utilized to deserialize the file 302 into the hierarchical representation 304. Typically, deserialization is performed by making a series of API calls to a suitably-configured collection of consumption APIs, as will be appreciated by the skilled artisan. This collection of APIs can be considered a collection of so-called consumption APIs because the consumption APIs consume the content of file 302 to produce the hierarchical representation 304.

In this particular example, once the file 302 is deserialized into hierarchical representation 304, the hierarchical representation is copied to provide a second hierarchical representation 308. In accordance with one or more embodiments, developer code which is not undergoing testing is then utilized to write the contents of (or serialize the) hierarchical representation 308 to second file 306. Again, any suitable hierarchical representation can be used. In this particular example, the hierarchical representation comprises an XML representation.

Once the first and second files 302, 306 are created, comparison module 212 can effectively compare the files to ascertain whether the files are semantically the same or similar. The process of moving from the first file 302 to the second file 306 is referred to as "round tripping". In one or more embodiments, round tripping in this manner abstracts the testing infrastructure represented by system 300 from the particular APIs that were utilized to create hierarchical representation 304. As will be appreciated by the skilled artisan, this alleviates the need to pre-define an expected result, such as a separate "expected" hierarchical representation that would be utilized to compare with hierarchical representation 304 in order to validate the developer code that created hierarchical representation 304. Doing so means that any arbitrary file can be the subject of the processing that is performed by system 300. One of the benefits that flows from this type of processing is that changes in the APIs do not require modification of the test cases and test case development can take place in parallel with the original creation or modification of the API.

Specifically, in illustrated and described embodiment, if comparison module 212 compares files 302, 306 and the result is favorable, a conclusion can be made that the developer code that processed the file 302 into the hierarchical representation 304 is valid and functioning as intended. In the case where APIs have been modified, testing can still be performed by comparing the first file 302 with the second file 306.

In the above-described examples, a collection of APIs was utilized to either process a hierarchical representation into a file or vice versa. In one more embodiments, the above-described methodology can be utilized in conjunction with construction of an object model that is logically interposed between hierarchical representations and files. As an example, consider FIG. 4.

Example Embodiment Utilizing Object Models

Figure 4:
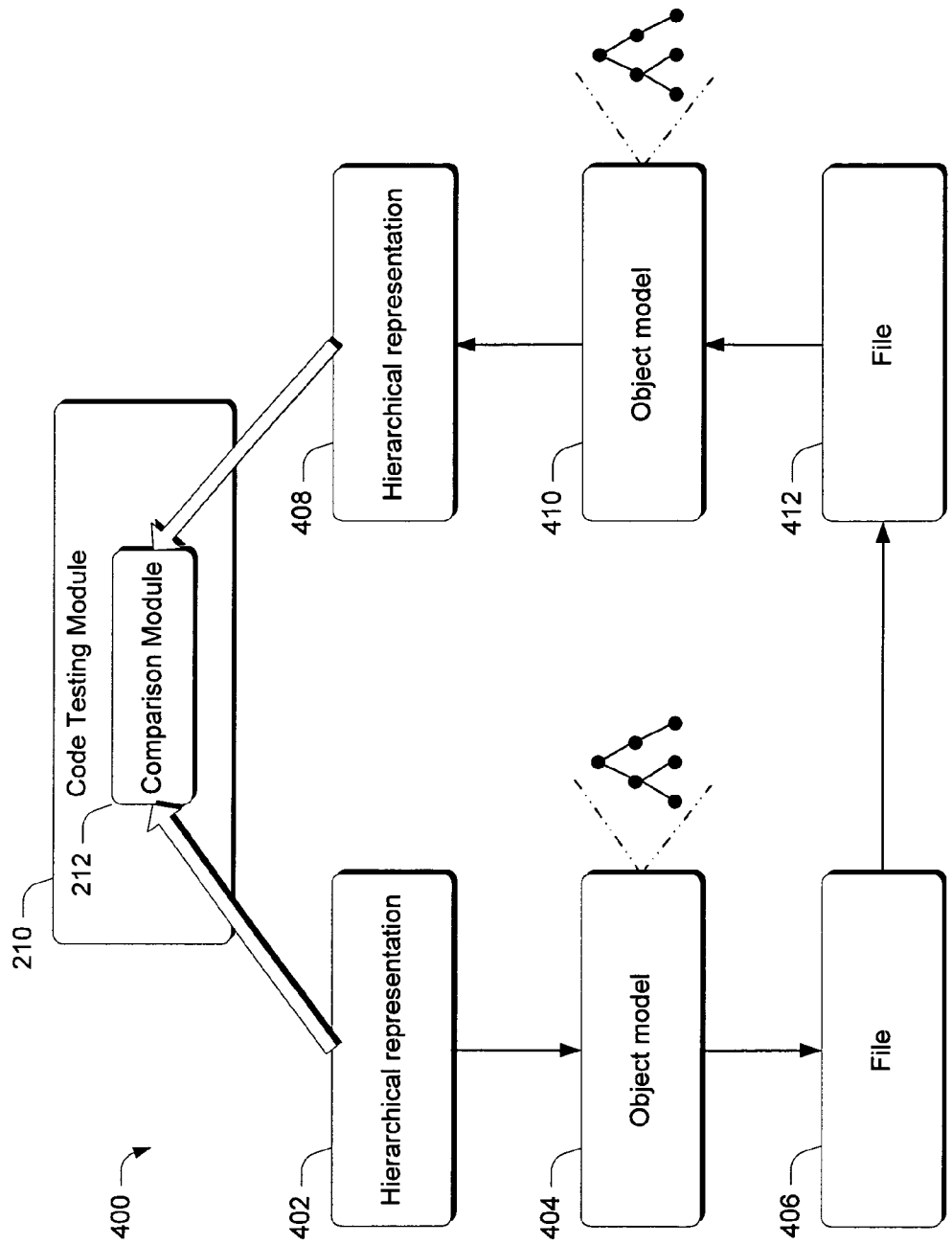
FIG. 4 illustrates a system in accordance with one or more embodiments.

FIG. 4 illustrates a system in accordance with one or more embodiments generally at 400. In this example, system 400 includes a first hierarchical representation 402 that describes information or data that is utilized to produce a first object model 404. The first object model 404 can be serialized by software code, such as developer code under test, into a first file 406. System 400 also includes a second hierarchical representation 408, a second object model 410 and a second file 412. In addition, system 400 includes a code testing module 210 which, in this example, includes a comparison module 212 that is configured to compare hierarchical representations 402, 408 which can be used to validate the developer code that serialized the object model 404 into file 406.

In one or more embodiments, the hierarchical representation 402 can include any suitable hierarchical representation that describes information or data. In at least some embodiments, the hierarchical representation can comprise an XML representation that includes nodes and sub-nodes corresponding to elements and sub-elements within the XML representation. In this example, developer code (e.g. production-side APIs) which is undergoing testing is utilized to process the object model 404 by serializing the object model into a file such as file 406. In this particular embodiment, code testing module 210 is utilized to validate the developer code that is utilized to serialize the object model 404 into the file 406. Typically, serialization is performed by making a series of API calls to a suitably-configured collection of APIs, as will be appreciated by the skilled artisan. This collection of APIs can be considered a collection of so-called production APIs because they produce the contents of file 406.

In this particular example, once the object model 404 is serialized into file 406, the file can be copied to provide a second file 412. In accordance with one or more embodiments, developer code which is not undergoing testing is then utilized to read the contents of file 412 and deserialize the file contents into second object model 410. Software code which is not under test can then be used to produce, from object model 410, hierarchical representation 408. Again, any suitable hierarchical representation can be used. In this particular example, the hierarchical representation comprises an XML representation.

Once the first and second hierarchical representations 402, 408 are created, comparison module 212 can effectively compare the hierarchical representations to ascertain whether the hierarchical representations are semantically the same or similar. In at least some embodiments, this can be done by ascertaining whether the elements and sub-elements in the hierarchical representations are semantically the same or similar. If the comparison performed by comparison module 212 is favorable, then the code under test (i.e. the production-side APIs) can be validated.

The process of moving from the first hierarchical representation 402 to the second hierarchical representation 408 is referred to as "round tripping". In one or more embodiments, round tripping in this manner abstracts the testing infrastructure represented by system 400 from the particular APIs that were utilized to create file 406. As will be appreciated by the skilled artisan, this alleviates the need to pre-define an expected result, such as a separate "expected" file that would be utilized to compare with file 406 in order to validate the developer code that created file 406. Doing so means that any arbitrary hierarchical representation can be the subject of the processing that is performed by system 400. One of the benefits that flows from this type of processing is that changes in the APIs do not require modification of the test cases and test case development can take place in parallel with the original creation or modification of the API.

To underscore this advantage, consider the situation in which an expected result file would be used to perform the comparison with file 406. In this case, any changes in the underlying APIs which would change the contents of file 406 would, necessarily, have to be reflected in the expected result file. Accordingly, this would mean that a new expected result file would have to be defined for even small changes to the APIs. For arbitrarily large API collections, this is a daunting task. Here, however, because the testing infrastructure is abstracted from the particular APIs, the same testing infrastructure can be used for modified APIs.

Specifically, in illustrated and described embodiment, if comparison module 212 compares hierarchical representations 402, 408 and the result is favorable, the conclusion can be made that the developer code that processed the object model 404 into the file 406 is valid and functioning as intended. In the case where APIs have been modified, testing can still be performed by comparing the first hierarchical representation 402 with the second hierarchical representation 408.

In this particular example, the APIs that are the subject of the testing comprise so-called production APIs. In a similar process, a testing infrastructure can be utilized to test so-called consumption APIs. As an example, consider FIG. 5.

Figure 5:
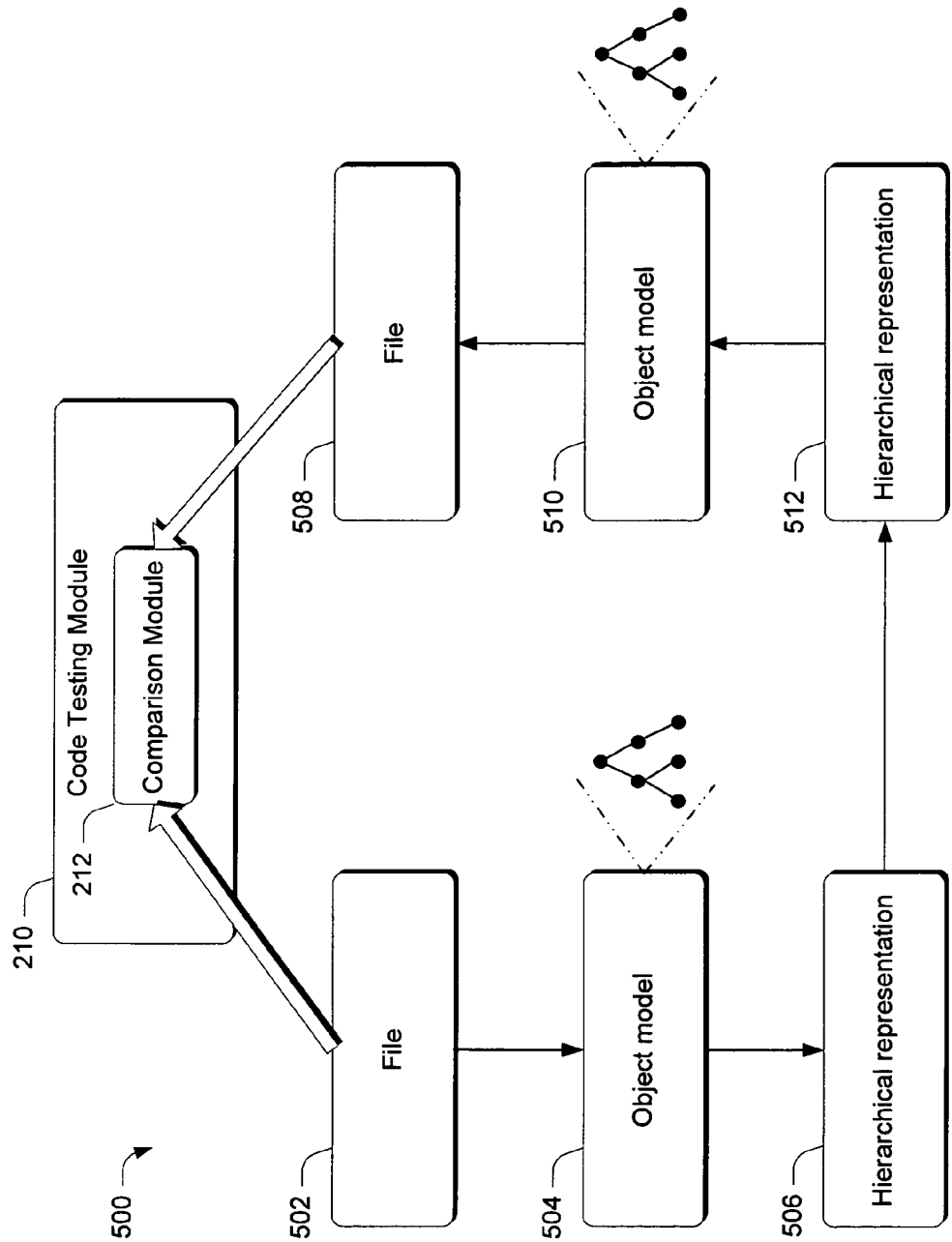
FIG. 5 illustrates a system in accordance with one or more embodiments.

FIG. 5 illustrates a system in accordance with one or more embodiments generally at 500. In this example, system 500 includes a first file 502 that contains information or data that can be deserialized by software code under test, such as developer code (e.g., consumption-side APIs), into object model 504. The object model 504 can then be used to produce a first hierarchical representation 506. System 500 also includes a second file 508, a second object model 510 and a second hierarchical representation 512. In addition, system 500 includes code testing module 210 which, in this example, includes comparison module 212 that is configured to compare files 502, 508 which can be used to validate the developer code that is utilized to deserialize file 502 into object model 504.

In one or more embodiments, the hierarchical representation 506 can include any suitable hierarchical representation that describes information or data. In at least some embodiments, the hierarchical representation can comprise an XML representation that includes nodes and sub-nodes corresponding to elements and sub-elements within the XML representation. In this example, developer code which is undergoing testing is utilized to process the file 502 by deserializing the file into object model 504. In this particular embodiment, code testing module 210 is utilized to validate the developer code that is utilized to deserialize the file 502 into the object model 504. Typically, deserialization is performed by making a series of API calls to a suitably-configured collection of consumption APIs, as will be appreciated by the skilled artisan. This collection of APIs can be considered a collection of so-called consumption APIs because the consumption APIs consume the content of file 502 to produce the object model 504.

In this particular example, once the file 502 is deserialized into object model 504, the object model is processed to produce hierarchical representation 506 which is copied to provide a second hierarchical representation 512. In accordance with one or more embodiments, developer code which is not undergoing testing is then utilized to produce, from the hierarchical representation 512, object model 510. Additional developer code is then used to write the contents of (or serialize the) object model 510 to second file 508. Again, any suitable hierarchical representation can be used. In this particular example, the hierarchical representation comprises an XML representation.

Once the first and second files 502, 508 are created, comparison module 212 can effectively compare the files to ascertain whether the files are semantically the same or similar. The process of moving from the first file 502 to the second file 508 is referred to as "round tripping". In one or more embodiments, round tripping in this manner abstracts the testing infrastructure represented by system 500 from the particular APIs that were utilized to create object model. As will be appreciated by the skilled artisan, this alleviates the need to pre-define an expected result, such as a separate "expected" hierarchical representation that would be utilized to compare with hierarchical representation 506 in order to validate the developer code that created object model 504. Doing so means that any arbitrary file can be the subject of the processing that is performed by system 500. One of the benefits that flows from this type of processing is that changes in the APIs do not require modification of the test cases and test case development can take place in parallel with the original creation or modification of the API.

Specifically, in illustrated and described embodiment, if comparison module 212 compares files 502, 508 and the result is favorable, a conclusion can be made that the developer code that processed the file 502 into object model 504 is valid and functioning as intended. In the case where APIs have been modified, testing can still be performed by comparing the first file 502 with the second file 508.

Example Methods

FIG. 6 illustrates a flow diagram that describes steps in a method in accordance with one or more embodiments. The method can be implemented in connection with any suitable hardware, software, firmware, or combination thereof. In at least some embodiments, the method can be implemented by a system such as the system shown and described in FIG. 1.

Step 600 converts a first hierarchical representation of information or data into a file. In at least some embodiments, this step can be performed at least in part by software code that is under test. Additionally, in at least some embodiments, this step can be performed by converting the first hierarchical representation into a first object model, and then using software code that is under test to serialize the object model to the file. The conversion process implemented by the step can include making a series of API calls to production APIs that are under test as described above.

Step 602 converts the file into a second hierarchical representation of information or data. In at least some embodiments, this step can be performed by first copying the file and then deserializing the file into a second object model. The object model can then be converted into the second hierarchical representation of information or data. Examples of how this can be done are provided above.

Step 604 compares the first and second hierarchical representations of information or data. In at least some embodiments, this step can be performed by a suitably-configured code testing module such as the ones described above. If the outcome of the comparison is favorable, the software code which was under test can be validated. If, on the other hand, the outcome of the comparison is not favorable, the software code which was under test can be invalidated.

FIG. 7 illustrates a flow diagram that describes steps in a method in accordance with one or more embodiments. The method can be implemented in connection with any suitable hardware, software, firmware, or combination thereof. In at least some embodiments, the method can be implemented by a system such as the system shown and described in FIG. 1.

Step 700 converts a first file into a hierarchical representation of information or data. In at least some embodiments, this step can be performed at least in part by software code that is under test. Additionally, in at least some embodiments, this step can be performed by converting the first file into a first object model using software code that is under test. The object model can then be converted into the hierarchical representation of information or data. The conversion process implemented by the step can include making a series of API calls to consumption APIs that are under test as described above.

Step 702 converts the hierarchical representation of information or data into a second file. In at least some embodiments, this step can be performed by first copying the hierarchical representation of data and then converting the hierarchical representation of data into a second object model. The second object model can then be converted into the second file. Examples of how this can be done are provided above.

Step 704 compares the first and second files. In at least some embodiments, this step can be performed by a suitably-configured code testing module such as the ones described above. If the outcome of the comparison is favorable, the software code which was under test can be validated. If, on the other hand, the outcome of the comparison is not favorable, the software code which was under test can be invalidated.

Having described in example system and methods in accordance with one or more embodiments, consider now an implementation example that describes an example hierarchical representation that can be utilized to provide a paginated document.

Implementation Example

The context of the example described just below is one in which a document package can be built to be compliant with the XML Paper Specification (XPS) Version 1. It is to be appreciated and understood that the various embodiments described in this document can be employed in connection with other standards that are different from the XPS standard without departing from the spirit and scope of the claimed subject matter. In addition, the various embodiments can be employed in connection with subsequent versions of the XPS Specification.

As a brief overview of the XPS standard, consider the following.

This XML Paper Specification, or XPS, describes the set of conventions for the use of XML and other widely available technologies to describe the content and appearance of paginated documents. It is written for developers who are building systems that process XPS content.

The XML Paper Specification describes a set of conventions for the use of XML and other widely available technologies to describe the content and appearance of paginated documents. It is written for developers who are building systems that process XPS content. One goal of XPS is to ensure the interoperability of independently created software and hardware systems that produce or consume XPS content. The XPS specification defines the formal requirements that producers and consumers satisfy in order to achieve interoperability.

The XPS specification describes a paginated-document format called the XPS Document. The format requirements are an extension of the packaging requirements described in the Open Packaging Conventions specification. That specification describes packaging and physical format conventions for the use of XML, Unicode, ZIP, and other technologies and specifications to organize the content and resources that make up any document.

The XPS Document format represents a set of related pages with a fixed layout, which are organized as one or more documents, in the traditional meaning of the word. A file that implements this format includes everything that is used to fully render those documents on a display device or physical medium (for example, paper). This includes all resources such as fonts and images that might be used to render individual page markings.

In addition, the format includes optional components that build on the minimal set of components that are used to render a set of pages. This includes the ability to specify print job control instructions, to organize the minimal page markings into larger semantic blocks such as paragraphs, and to physically rearrange the contents of the format for easy consumption in a streaming manner, among others.

The XPS Document format uses a ZIP archive for its physical model. The Open Packaging Conventions specification describes a packaging model, that is, how the package is represented internally with parts and relationships. The XPS Document format includes a well-defined set of parts and relationships, each fulfilling a particular purpose in the document. The format also extends the package features, including digital signatures, thumbnails, and interleaving.

The packaging conventions described in the Open Packaging Conventions specification can be used to carry any payload. A payload is a complete collection of interdependent parts and relationships within a package. The XPS specification defines a particular payload that contains a static or "fixed-layout" representation of paginated content: the fixed payload.

A package that holds at least one fixed payload and follows the rules described in the XPS specification is referred to as an XPS Document. Producers and consumers of XPS Documents can implement their own parsers and rendering engines based on this specification.

XPS Documents address the requirements that information workers have for distributing, archiving, rendering, and processing documents. Using known rendering rules, XPS Documents can be unambiguously reproduced or printed without tying client devices or applications to specific operating systems or service libraries. Because the XPS Document is expressed in a neutral, application-independent way, the content can be viewed and printed without the application used to create the package.

A payload that has a FixedDocumentSequence root part is known as a fixed payload. A fixed payload root is a FixedDocumentSequence part that references FixedDocument parts that, in turn, reference FixedPage parts. There can be more than one fixed payload in an XPS Document.

A specific relationship type is defined to identify the root of a fixed payload within an XPS Document: the XPS Document StartPart relationship. The primary fixed payload root is the FixedDocumentSequence part that is referenced by the XPS Document StartPart relationship. Consumers such as viewers or printers use the XPS Document StartPart relationship to find the primary fixed payload in a package. The XPS Document StartPart relationship points to the FixedDocumentSequence part that identifies the root of the fixed payload.

The payload includes the full set of parts used to process the FixedDocumentSequence part. All content to be rendered is contained in the XPS Document. The parts that can be found in an XPS Document are listed the table just below, some of which are described in more detail below the table.

| Name | Description | Required/Optional |
|---|---|---|
| FixedDocumentSequence | Specifies a sequence of fixed documents. | REQUIRED |
| FixedDocument | Specifies a sequence of fixed pages. | REQUIRED |
| FixedPage | Contains the description of the contents of a page. | REQUIRED |
| Font | Contains an OpenType or TrueType font. | REQUIRED if a <Glyphs> element is present |
| JPEG image PNG image TIFF image Windows Media Photo image | References an image file. | REQUIRED if an <ImageBrush> element is present |
| Remote resource dictionary | Contains a resource dictionary for use by fixed page markup. | REQUIRED if a key it defines is referenced |
| Thumbnail | Contains a small JPEG or PNG image that represents the contents of the page or package. | OPTIONAL |
| PrintTicket | Provides settings to be used when printing the package. | OPTIONAL |
| ICC profile | Contains an ICC Version 2 color profile optionally containing an embedded Windows Color System (WCS) color profile. | OPTIONAL |
| DocumentStructure | Contains the document outline and document contents (story definitions) for the XPS Document. | OPTIONAL |
| StoryFragments | Contains document content structure for a fixed page. | OPTIONAL |
| SignatureDefinitions | Contains a list of digital signature spots and signature requirements. | OPTIONAL |
| DiscardControl | Contains a list of resources that are safe for consumers to discard during processing. | OPTIONAL |

FixedDocumentSequence Part

The FixedDocumentSequence part assembles a set of fixed documents within the fixed payload. For example, a printing client can assemble two separate documents, a two-page cover memo and a twenty-page report (both are FixedDocument parts), into a single package to send to the printer.

The FixedDocumentSequence part is the only valid root of a fixed payload. Even if an XPS Document contains only a single fixed document, the FixedDocumentSequence part is still used. One FixedDocumentSequence part per fixed payload is used.

Fixed document sequence markup specifies each fixed document in the fixed payload in sequence, using <DocumentReference> elements. The order of <DocumentReference> elements determines document order and is preserved by editing consumers. Each <DocumentReference> element should reference a FixedDocument part by relative URI.

FixedDocument Part

The FixedDocument part is a common, easily indexed root for all pages within the document. A fixed document identifies the set of fixed pages for the document. The markup in the FixedDocument part specifies the pages of a document in sequence using <PageContent> elements. The order of <PageContent> elements determines page order and is preserved by editing consumers. Each <PageContent> element should reference a FixedPage part by relative URI.

FixedPage Part

The FixedPage part contains all of the visual elements to be rendered on a page. Each page has a fixed size and orientation. The layout of the visual elements on a page is determined by the fixed page markup. This applies to both graphics and text, which is represented with precise typographic placement. The contents of a page are described using a powerful but simple set of visual primitives.

Each FixedPage part specifies the contents of a page within a <FixedPage> element using <Path> and <Glyphs> elements (using various brush elements) and the <Canvas> grouping element. The <ImageBrush> and <Glyphs> elements (or their child or descendant elements) can reference Image parts or Font parts by URI. They should reference these parts by relative URI.

Image Parts

Image parts reference image files. A single image may be shared among multiple fixed pages in one or more fixed documents. Images referenced in markup are internal to the package. References to images that are external to the package are invalid.

Images are included in XPS Documents with an <ImageBrush> element and an ImageSource attribute to reference a part with the appropriate content type. XPS Documents support the following image formats: JPEG, PNG, TIFF, and Windows Media Photo.

Thumbnail Parts

Thumbnails are small images that represent the contents of a fixed page or an entire XPS Document. Thumbnails enable users of viewing applications to select a page easily. Thumbnail images may be attached using a relationship to the FixedPage parts. Each FixedPage part does not have more than one thumbnail part attached.

Although the Open Packaging Conventions specification allows thumbnails to be attached to any part, XPS Document consumers should process thumbnails associated via a package relationship from the package as a whole or via a relationship from a FixedPage part. These thumbnails are either in JPEG or PNG format. Thumbnails attached to any other part should be ignored by XPS Document consumers.

Font Parts

Fonts are stored in font parts. XPS Documents support the OpenType font format, which includes TrueType and CFF fonts. To support portability, Unicode-encoded fonts should be used.

Font parts are referenced using the FontUri attribute of the <Glyphs> element. A single font may be shared among multiple fixed pages in one or more fixed documents. Font references are internal to the package, thus, external references to fonts are invalid.

If the referenced font part is a TrueType Collection, the fragment portion of the URI indicates the font face to be used. The use of URI fragments is specified in the BNF of Generic URI Syntax specification. The fragment contained in the FontURI attribute value is an integer between 0 and n−1 inclusive, where n is the number of font faces contained in the TrueType Collection. For example, to reference the first font face in the font part "../Resources/Fonts/CJKSuper.ttc", the value of the FontUri attribute is "../Resources/Fonts/CJKSuper.ttc#0". If no fragment is specified, the first font face is used in the same way as if the URI had specified "#0".

Remote Resource Dictionary Parts

A remote resource dictionary allows producers to define resources that can be reused across many pages, such as a brush. This is stored in a Remote Resource Dictionary part.

PrintTicket Parts

PrintTicket parts provide user intent and device configuration information to printing consumers. PrintTicket parts are processed when the XPS Document is printed. PrintTicket parts can be attached only to FixedDocumentSequence, FixedDocument and FixedPage parts and each of these parts attaches no more than one PrintTicket. PrintTickets can provide override settings to be used when printing the part to which they are attached.

SignatureDefinitions Part

Producers may add digital signature requests and instructions to an XPS Document in the form of signature definitions. A producer may sign against an existing signature definition to provide additional signature information. A recipient of the document may also sign the XPS Document against a signature definition—this is referred to as "co-signing." Digital signature definitions are stored in a SignatureDefinitions part. A FixedDocument part refers to a SignatureDefinitions part using a relationship of the SignatureDefinitions type.

DocumentStructure Part

Explicitly authored document structure information is stored in the DocumentStructure part. This part contains the document outline and defines the framework for every element in fixed pages in terms of semantic blocks called stories. Stories are split into StoryFragments parts, which contain content structure markup that defines semantic blocks such as paragraphs and tables.

Document structure markup contains a root <DocumentStructure> element. The <DocumentStructure> element uses a Document Structure namespace.

The DocumentStructure part is referenced by relationship from the FixedDocument part. Consumers may provide an algorithmic construction of the structure of an XPS Document based on a page-layout analysis, but they cannot use such a method to derive structure for any part of the XPS Document included in the DocumentStructure part. For example, a consumer capable of calculating reading order from the layout of the document uses the reading order specified in the DocumentStructure part, even though the derived order may be perceived as preferable to the specified order.

StoryFragments Part

The StoryFragments part contains content structure markup (for example, for tables and paragraphs) associated with a single fixed page.

StoryFragments part markup contains a root <StoryFragments> element. The <StoryFragments> element uses a specified Document Structure namespace.

In accordance with the principles described above, the markup that describes a particular XPS document can be considered as a hierarchical representation of information or data which can be processed or converted into a file that can be rendered on a consuming device. Accordingly, in those embodiments that test production APIs, the production APIs can be used to convert the hierarchical representation into a particular file which is then converted back into a hierarchical representation for comparison. Likewise, in those embodiments that test consumption APIs, the consumption APIs can be used to convert a file into a hierarchical representation which is then converted back into a file for comparison.

Example System

FIG. 8 illustrates an example computing device 800 that can implement the various embodiments described above. Computing device 800 can be, for example, various computing device, such as that illustrated in FIG. 1 or any other suitable computing device.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or non-volatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide a testing infrastructure that abstracts test cases from APIs in a manner that allows for round tripping between production and consumption and APIs.

In at least some embodiments, first information or data can be processed by software code under test, for example production-side APIs, to produce a first file. This first file can then be processed by other software code to produce second information or data which is then compared to the first information or data to ascertain whether the first and second information or data are semantically the same or similar. If the first and second information or data compares favorably, then the software code under test can be validated. In at least some embodiments, the first and second information or data can comprise a hierarchical representation of data such as that which can be represented in XML.

In at least some other embodiments, a first file can be processed by software code under test, for example consumption-side APIs, to produce first information or data. The first information or data can then be processed by other software code to produce a second file which is then compared to the first file to ascertain whether the first and second files are semantically the same or similar. If the first and second files compare favorably, then the software code under test can be validated. In at least some embodiments, the first and second information or data can comprise a hierarchical representation of data such as that which can be represented in XML.

Further, in at least some embodiments, the testing infrastructure can produce, in the production-side case, an object model from the first information or data and/or from the first file. Similarly, in at least other embodiments, the testing infrastructure can produce, in the consumption-side case, an object model from the first file and/or the first information or data.

Using the techniques described above, test cases can be abstracted from APIs to allow for round tripping between production and consumption APIs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
converting a first hierarchical representation of information or data into a file using, at least in part, software code that is under test, the software code under test being configured to perform serialization, the converting comprising converting the first hierarchical representation into an object model and then, using the software code that is under test to serialize the object model to the file by making a series of Application Program Interface (API) calls to production APIs that are under test;
converting the file into a second hierarchical representation of information or data; and
comparing the first and second hierarchical representations to ascertain whether the software code under test is valid.

2. The method of claim 1, wherein the act of converting the file into a second hierarchical representation comprises first copying the file to provide a copied file, and then converting the copied file into the second hierarchical representation.

3. The method of claim 1, wherein the act of converting the file into a second hierarchical representation comprises using the file to produce an object model and then converting the object model into the second hierarchical representation.

4. The method of claim 1, wherein the first and second hierarchical representations comprise Extensible Markup Language (XML).

5. The method of claim 1, wherein the first hierarchical representation is compliant with a XML Paper Specification (XPS).

6. A computer-implemented method comprising:
converting a first file into a hierarchical representation of information or data using, at least in part, software code that is under test, the software code being configured to perform deserialization, the converting comprising converting the first file into an object model using the software code that is under test and then converting the object model into the hierarchical representation by making a series of Application Program Interface (API) calls to consumption APIs;
converting the hierarchical representation into a second file; and
comparing the first and second files to ascertain whether the software code under test is valid.

7. The method of claim 6, wherein the act of converting the hierarchical representation into the second file comprises:
copying the hierarchical representation to provide a copied hierarchical representation;
converting the copied hierarchical representation into an object model; and
converting the object model into the second file.

8. The method of claim 6, wherein the first file defines a document that is compliant with a XML Paper Specification (XPS).

9. A computer-implemented method comprising:
providing a testing infrastructure that is to be utilized to test developer code that is to process XML Paper Specification (XPS) data, the developer code being configured to perform at least one of serialization or deserialization; and
using the testing infrastructure to abstract test cases from APIs under test in a manner that allows for round tripping between production and consumption APIs by using a comparison module to compare hierarchical representations of information or data to ascertain whether the hierarchical representations are semantically the same or similar, wherein if the hierarchical representations are semantically the same or similar, then validating the developer code, the act of using further comprising producing first and second object models.

10. The method of claim 9, wherein the act of using is performed without predefining an expected result for comparison.

11. The method of claim 9, wherein the act of using comprises using the comparison module to compare first and second files to ascertain whether the first and second files are semantically the same or similar, wherein if the first and second files are semantically the same or similar, then validating the developer code.

12. The method of claim 11, wherein the act of using is performed without predefining an expected result for comparison.

* * * * *